United States Patent Office 3,783,117
Patented Jan. 1, 1974

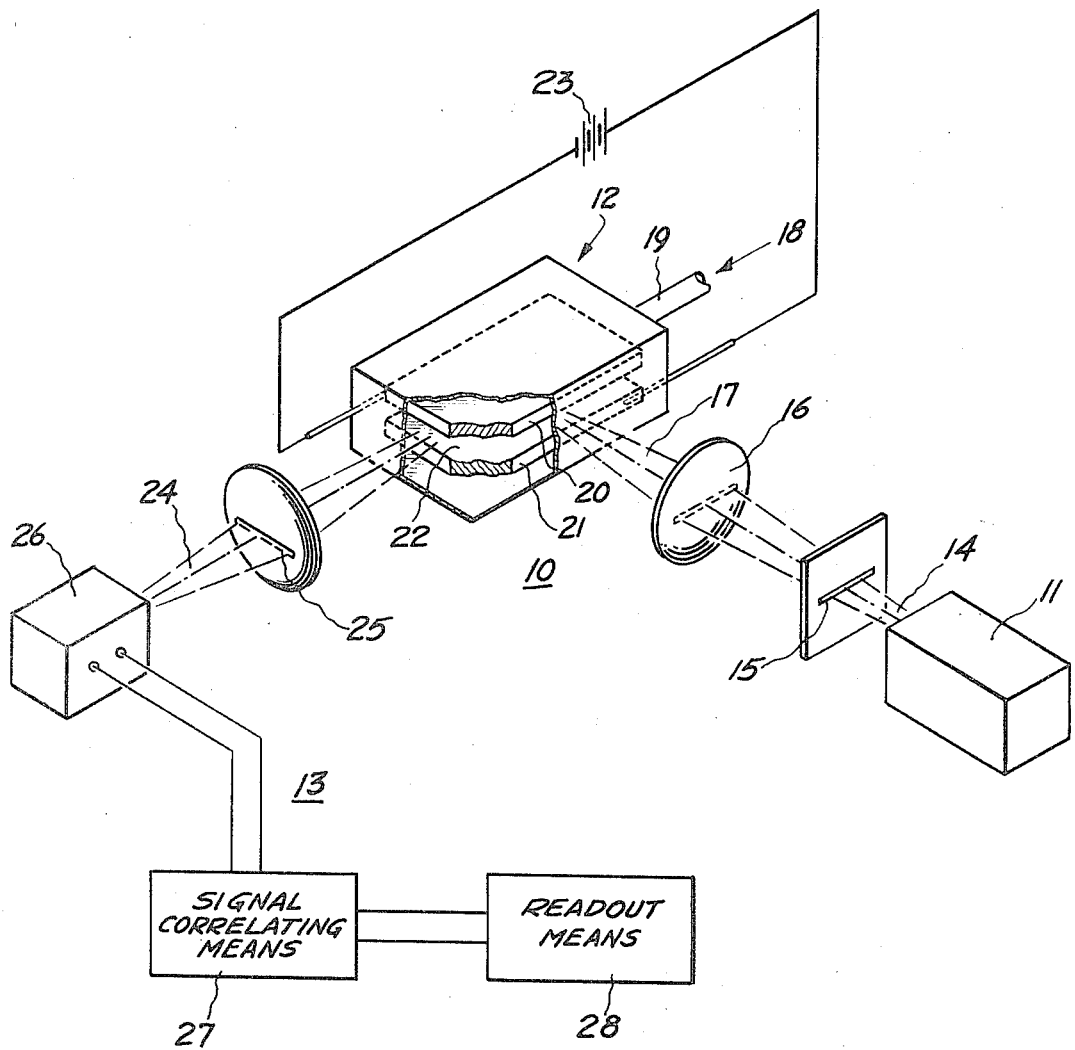

3,783,117
MEASUREMENTS OF PARTICLES AND
MOLECULES
Charles P. Bean, Schenectady, N.Y., assignor to
General Electric Company
Original application Oct. 19, 1970, Ser. No. 81,824, now
Patent No. 3,708,402. Divided and this application
Oct. 20, 1972, Ser. No. 299,368
Int. Cl. B01k 5/00
U.S. Cl. 204—180 R                                    3 Claims

ABSTRACT OF THE DISCLOSURE

Particles to be measured and analyzed are placed in solution in a light transmissive cell. A shaped, flat beam is passed into the cell. Particles are urged through the beam and their passage causes time variations in the intensity of light scattered thereby. The scattered light is collected and transformed into an electrical signal. Signal is correlated with itself as a time varying function and the electrophoretic mobility of the particles is determined.

---

This is a division of application Ser. No. 81,824, filed Oct. 19, 1970, now U.S. Pat. 3,708,402.

This invention relates to the detection and measurement of characteristics of particles and molecules in liquid suspension. More patricularly, the invention relates to the determination of the electrophoretic mobility of particles.

This invention is related to the co-pending application of Bean and DeBlois, Ser. No. 13,115, filed Feb. 20, 1970, and to the concurrently filed application of Golibersuch, Ser. No. 81,825, filed on Oct. 19, 1970, now U.S. Pat. No. 3,742,348, both of which are assigned to the assignee of this invention.

In particle physics there are a number of fields of application for the detection and measurement of submicron, or larger, particles. Such particles may be characterized by certain parameters to determine the number, size, charge, and density, for example. Such characterizations are useful with respect to the identification and counting of proteins, blood constituents, cells microscopic organisms and the like. One important parameter useful in such characterization is electrophoretic mobility, the velocity acquired by a particle in a unit of electric field. Although methods and apparatus are available to measure and determine such parameters, many such methods presently in use are either limited in application, time consuming, or not sufficiently accurate or sensitive.

Accordingly, it is an object of this invention to provide apparatus and method for the improved characterization of small particles.

Still another object of the invention is the provision of improved apparatus and method for the determination of the electrophoretic mobility of small particles.

Briefly stated, in accord with one embodiment of the invention, small particles to be characterized are caused to flow in suspension into a fluid-impermeable, light-transmissive cell and a beam of light is generated, collimated, formed and passed through the particle containing fluid in the cell. Light scattered from the particles is collected, collimated and directed to a detector which generates an electrical signal representative of the particles. The signal is correlated against itself as a time varying function to determine the information desired. If the beam end is flat and is directed through a pair of parallel electrodes between which an electric field is established, particles are electrophoretically urged through the beam. The fluctuation of scattered light due the passage of particles through the beam results in a time-varying signal which yields the electrophoretic mobility of the specie of particles.

The novel features believed to be characteristic of the invention are set forth in the appended claims. The invention itself, together with further objects and advantages thereof, may best be appreciated by referring to the attached drawing in which the sole illustration is a perspective view of apparatus embodying the invention in a simple schematic form.

In the drawing, apparatus for measuring particles and melocules is illustrated generally at 10 and comprises, basically a light source 11 for generating a beam, a scattering cell 12 and detecting and analyzing means 13. In a preferred embodiment, light source 11 which may be any suitable source of monochromatic or polychromatic light, but which may preferably be a laser because of the physical characteristics of the beam generated thereby, produces a beam 14 which is focused through a slit 15 and impinges upon a collimating lens 16 for finally shaping the same. The shaped beam 17 is incident upon cell 12. Cell 12 contains a fluid which may, for example, be water or alcohol or any suitable suspension medium and a flow of fluid containing the desired specie of particles to be analyzed is caused to flow into the cell by means indicated generally as arrow 18 directed towards duct 19. Within cell 12, a pair of plane-parallel electrodes, for example, 20 and 21, which define an interelectrode spacing 22 are disposed in parallel spaced relationship, substantially parallel to a plane passing through slit 15, such that the flat beam enters the cell so as to define a thin region within the inter-electrode spacing 22 parallel to electrodes 20 and 21. An electric potential is applied by a voltage source indicated generally as battery 23, which causes an electric field to exist between parallel plates 20 and 21, such that particles of the specie to be analyzed are electrophoretically urged from one plate to another and in so moving pass through the flat collimated beam 17 and cause scattering of its light. A collection of scattered light is emergent from the cell, is collimated and focused into a beam 24 by lens 25 and is incident upon photodetector 26 which may, for example, be a simple photomultiplier tube or the equivalent thereof. Detector 26 provides a voltage signal which may, for example, be in the form of a pulse representative of each particle passing through the beam and causing scattered light. The electrical signal from detector 26 is passed to a signal correlating means 27 wherein the detected voltage is rendered intelligible. The output of the signal correlating means is fed to a read-out means 28, which may, for example, be a cathode ray oscilloscope, and X-Y recorder, a digital computer, or other means for electrically recording and/or storing the electric signal derived by the detector and the signal correlating means.

Preferably, the beam is uniform in intensity across its width as it passes through the cell and between the electrode plates, so that each individual particle contributes a square pulse to the output recorded by the photomultiplier, which pulse has a height $\Delta V$ where V is the voltage recorded and a signal length $\tau$. The aggregate of these signals from a plurality of pulses is difficult, if not impossible to detect and analyze due to receipt of a plurality of voltage signals arriving at the same time. According to prior art apparatus and methods, single particles measured by passing the same through very small pores such that only one particle moves through at a given time and a single pulse of height $\Delta V$ and width $\tau$ could be measured, thus avoiding the problem of plural particle illegibility. In the apparatus utilized in the present invention, the aggregate of a number of signals which cannot be detected individually, but which are all derived from the passage of particles having the same electrophoretic mobility through a beam at substantially the same time or during a time which is finite and short, is rendered intelligible. In the practice of the invention, the voltage signal is correlated against itself as a time varying function, and the indefiniteness in the signal caused by the many signals being in overlapping relationship with one another, as well as the possibility of intra-system electronic noise, is eliminated.

Expressed very simply, the pertinent signal correlation function is obtained by multiplication of the time varying voltage signal against a delayed image of itself to obtain a voltage squared as a function of delay time. Operationally, the products of the voltage $V(t)$ at a time $(t)$ and the voltage $V(t+\Delta t)$ at some later time $(t+\Delta t)$ are computed for many different times $(t)$. The correlation function $V(t) \cdot V(t+\Delta t)$ with a delayed time $A(\Delta t)$ is then the average of all these products. Such averaging may be performed, for example, by an electronic instrument such as the model 100 signal correlator manufactured by Princeton Applied Research Co. of Princeton, N.J.

In the case of the passage of a plurality of particles of the same specie through a uniform intensity beam wherein the beam thickness is very small as compared with the thickness dimension of the inner electrode spacing, the signal correlation is given by the equation $$A(\Delta t) = N\Delta V^2 (1 - \Delta t / \tau)$$

Where A is the correlation function, $\Delta t$ is the delay between the compared voltages $\Delta V$ is the pulse of voltage caused by a single particle, N is the number of particles in the image of the beam and $\tau$ is the transit time of the particle through the beam. From the foregoing, it may be seen that the transit time, being the only unknown in the signal correlation function, may be measured. The transit time is related to the electrophoretic mobility $\mu$ of the specie of particles being analyzed by the relationship $\tau = hL/\mu V_0$ where $h$ is the electrode spacing and L is the beam width, $\tau$ is the electrophoretic mobility and $V_0$ is the voltage applied between the electrodes.

A typical value of $\mu$ for particles determined in accord with the present invention is approximately $5 \times 10^{-5}$ centimeters$^2$/volt sec. When the electrodes are plane-parallel in the cell and a potential of 100 volts is applied between plates which are approximately 1 centimeter apart and the beam thickness is approximately 0.01 centimeter, the above equation yields a time constant $\tau$ of approximately 2 seconds.

In accord with another feature of the present invention, the correlation function may be plotted on an X–Y recorder, or shown on a cathode ray oscilloscope from which an instantaneous photograph may be taken, and generally provides a logarithmic plot of the voltage correlation function with intercepts in the X and Y axis. The value of the X and Y axis at the intercepts is indicative of the characteristics of the particle being measured.

According to still another feature of the invention, several species of particles may be measured simultaneously. To measure several species of particles simultaneously, the several species are added to the fluid in the cell in suspension therein and the correlation functions plotted on an X–Y recorder or a cathode ray oscilloscope such that the slopes and intercepts (extrapolated) of two logarithmic functions may be observed. Thus, the intercepts and the slope of the curves help to characterize not only the electrophoretic mobility, and hence the transit time, of the particles but also their number or size and relative relationships between the two.

As is mentioned hereinbefore, it is desirable that the beam passing through the electrodes within the optical cell should be of substantially uniform intensity. Any deviation from uniform intensity may lead to a slight and relatively unimportant change in the form of the correlation function $A(\Delta t)$. This does not significantly alter the measurement, so long as the deviation from uniform intensity is relatively minor.

Another source of possible difficulty lies in the possibility of diffusion of the particles in the beam giving rise to fluctuations in the scattered light in addition to those caused by the passage of the particles transversely through the beam. These fluctuations are, however, of much shorter time scale than the pulses caused by electrophoretic motion of the particles through the beam and the use of a voltage correlation function eliminates such noise as well as other sources of noise.

A further feature of the invention relates to the desirability of using non-polarizing electrodes in the optical cell in accord with the invention. Although not meant to be completely inclusive of all such typical nonpolarizing electrodes, silver covered with silver chloride or platinized platinum electrodes, both of which should be used on each of a pair of electrodes when used, are suitable. The use of non-polarizing electrodes insures that the voltage difference through the solution within the cell between the electrodes is uniform. With nonpolarizing electrodes, periodic reversals of voltage may further be utilized to ensure no long-term polarization which could lead to non-uniform fields.

By the foregoing, I have disclosed new and simplified apparatus and method for determining parameters, principally electrophoretic mobility of small particles in solution. The use of this method makes possible the measurement of the electrophoretic mobility of particles within the range of 20 A.U. to 2000 A.U. in diameter with a capability of accuracy that is to within a few percent. Additionally, the measurement is performed in a very simplified manner and may be performed very rapidly within a matter of minutes for each measurement and may be made susceptible to visual plotting or recording of the results therefrom for later observation.

While the invention is disclosed herein with respect to certain specific embodiments and examples, many modifications and changes will readily occur to those skilled in the art. Accordingly, by the appended claims, I intend to cover all such modifications and changes as fall within the true spirit and scope of the foregoing disclosure.

What I claim as new and desire to secure by Letters Patent of the United States is:

1. The method of analyzing and characterizing particles including the steps of:

(a) generally, shaping and focusing a light beam of a predetermined pattern;

(b) passing said beam through an optical cell containing an electric field;

(c) introducing particles of a predetermined species into said cell;

(d) causing said particles to pass through said beam under the influence of said beam;

(e) collecting light scattered from said beam by the passage of said particles;

(f) forming a voltage signal from said collected scattered light; and (g) correlating said voltage signal as a time varying function to determine the electrophoretic mobility of said particles.

2. The method of claim 1 wherein said beam is formed into a flat thin beam.

3. The method of claim 1 wherein a plurality of species are simultaneously analyzed and said correlation yields the electrophoretic mobility of each species.

References Cited

UNITED STATES PATENTS

| | | | |
|---|---|---|---|
| 2,379,158 | 6/1945 | Kalischer | 356—102 X |
| 2,412,602 | 12/1946 | Chambers et al. | 204—180 R X |
| 2,494,441 | 1/1950 | Hillier | 356—102 X |
| 3,320,148 | 5/1967 | Skeggs | 204—180 R |
| 3,049,047 | 8/1962 | Jolanyi et al. | 356—102 |
| 3,432,414 | 3/1969 | Rand | 204—299 X |
| 3,446,558 | 5/1969 | Seaton | 356—28 X |
| 3,454,487 | 7/1969 | Riddick | 204—299 |
| 3,457,419 | 7/1969 | Rosa | 356—28 X |
| 3,498,905 | 3/1970 | Strickler | 204—299 |
| 3,511,227 | 5/1970 | Johnson | 128—2.05 |
| 3,519,353 | 7/1970 | Franz et al. | 356—102 |
| 3,523,733 | 8/1970 | Kling et al. | 356—102 X |
| 3,561,875 | 2/1971 | Ried, Jr., et al. | 356—103 |
| 3,591,290 | 7/1971 | Zinner et al. | 356—102 |
| 3,621,220 | 11/1971 | Ford, Jr. | 356—103 X |
| 3,630,617 | 12/1971 | Marrett et al. | 356—103 X |

JOHN H. MACK, Primary Examiner

A. C. PRESCOTT, Assistant Examiner

U.S. Cl. X.R.

204—299